March 11, 1952 — J. A. KONOPKA — 2,589,094
PHOTOGRAPHIC ENLARGING MASK
Filed Jan. 23, 1950 — 2 SHEETS—SHEET 1

Joseph A. Konopka
INVENTOR.

BY *Clarence A. O'Brien*
and *Harvey B. Jacobson*
Attorneys

March 11, 1952 J. A. KONOPKA 2,589,094
PHOTOGRAPHIC ENLARGING MASK
Filed Jan. 23, 1950 2 SHEETS—SHEET 2

Joseph A. Konopka
INVENTOR.

Patented Mar. 11, 1952

2,589,094

UNITED STATES PATENT OFFICE 2,589,094

PHOTOGRAPHIC ENLARGING MASK

Joseph A. Konopka, Detroit, Mich.

Application January 23, 1950, Serial No. 139,993

1 Claim. (Cl. 88—24)

This invention relates to the class of photographic equipment, and more particularly to an enlarging easel and mask for simplifying photographic printing.

An object of the invention is to provide an enlarging easel and mask for photographic printing which will enable the simple masking of the borders of a print within the easel while providing means for ready withdrawal of the print when once exposed.

Yet another object of the invention is to provide an enlarging easel and mask for photographic work which will automatically center a sheet of sensitized paper to provide proper borders for the paper.

A further object of the invention is to provide means incorporated in a photographic printing easel for ready and speedy withdrawal of a sheet of sensitized paper when once exposed.

It is within the concept of the invention to provide for a photographic easel having a base in which a slide is mounted thereon for selective engagement with a sheet of photographic paper to withdraw the sheet of paper from the easel when once exposed.

Still further objects of the invention reside in the provision of a photographic easel and mask that is strong, durable, highly efficient in operation, simple in construction and design since it is made from only four major parts, capable of being fabricated from any number of suitable materials, easy to use, and relatively inexpensive to manufacture.

These, together with the various ancillary objects of the invention which will become apparent as the following description proceeds, are attained by this photographic easel and mask, a preferred embodiment of which has been illustrated, by way of example only, in the accompanying drawings, wherein.

Figure 1:
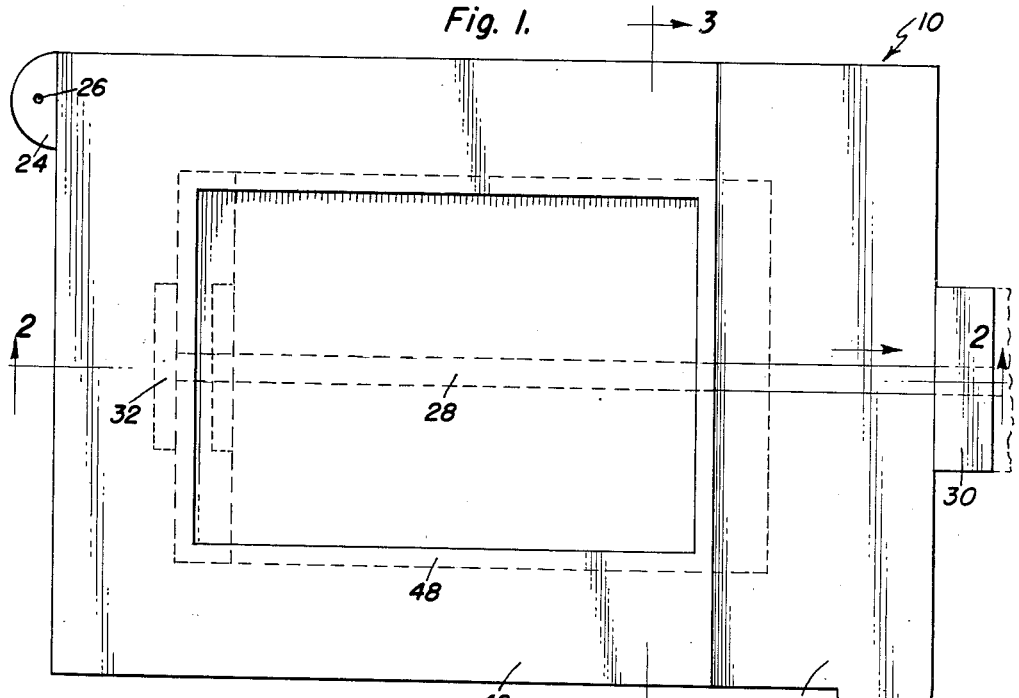
Figure 1 is a top plan view of the invention showing the elements capable of relative motion in two alternative positions.
Figure 3:
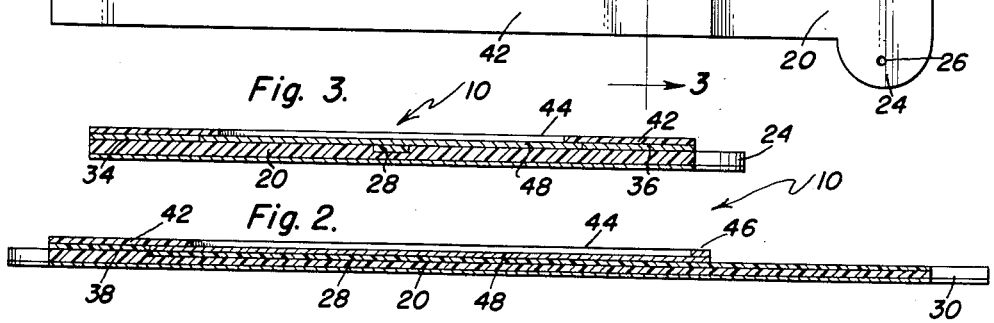
Figure 3 is another vertical sectional view as taken along line 3—3 in Figure 1.
Figure 2:
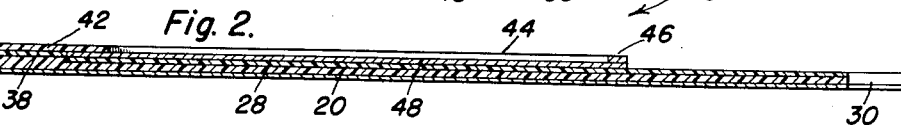
Figure 2 is a vertical sectional view as taken along line 2—2 in Figure 1.

With continuing reference to the accompanying drawings wherein like reference numerals designate similar parts throughout the various views, the reference numeral 10 generally designates the photographic enlarging easel and mask comprising the present invention. The device comprises four major parts or elements which include a base generally indicated at 12, a slide 14, an intermediate U-shaped member 16, and an upper frame member 18. Each of the principal elements are preferably made from an opaque plastic materials such as a thermosetting resin or the like which is white in color.

The base 12 comprises a substantially rectangular base plate 20 having a longitudinally extending central groove 22 formed therein. At suitable portions of the periphery of the plate 20 are provided downwardly extending lugs 24 which may be made in any convenient shape, though shown as semi-circular in their preferred embodiment. The lugs 24 are provided with apertures 26 through which thumb tacks or the like may be emplaced for securing the photographing mask in any manner and position desired.

The slide 14 comprises a longitudinally extending bar 28 of substantially rectangular cross section which is adapted to fit within the groove 28 for sliding relative to the plate 20. A handle 30 of any convenient size and shape is secured to the outer end of the slide bar 28. Secured to the upper surface of the slide bar 28 is a cross bar 32 for a purpose to be henceforth explained.

The intermediate member 16 which is of substantially U-shape is provided with a pair of parallel legs 34 and 36 which are integrally formed with a central portion 38 which is formed with a notch 40 therein of substantially the same shape as the cross bar 32. The legs 34 and 36 and the central connecting portion 38 encompass an area of exactly the size of sensitized printing paper to be used in the photographic enlarging mask. The intermediate member 16 is secured to the base plate 20 by cementing using a suitable adhesive though it is within the contemplation of the invention to spread on the under surface of the member 16 a solvent of the plastic material forming the component parts of the invention so that the intermediate member 16 may be integrally bonded to the plate 20. An intermediate member 16 is preferably of the precise thickness of that of a sheet of double weight printing paper.

Secured to the intermediate member 16 by cementing or bonding as described previously is the substantially rectangular frame member 18 which comprises a plate 42 of plastic material having a substantially rectangular opening 44 therein. The side 46 of the plate 42 is at least of such size to be equal to the width of the border required on the finished picture as must be the width of the other sides of the frame member 18.

As can be readily understood, when a sheet of sensitized paper such as that indicated by reference numeral 48 is emplaced through the opening between the opposed legs 34 and 36 between the frame member 18 and the base 12, it may be easily slid in to be encompassed by the intermediate member 16. The frame member 18 will then automatically provide a border for the print to be formed on the sensitized paper 48. Since the slide 28 lies flush with the upper surface of the base plate 20 while the cross bar 32 is mounted on the slide bar 28 and extends above it to fit within the notch 40 in the intermediate member 16, when the handle 30 is pulled outwardly the cross bar 32 will abut against the sheet of paper 48 and urge it outwardly from the encompassing relationship of member 16. Thus during the exposure a suitable border of any desired and predetermined width is formed on the sensitized paper thus simplifying the process of centering the sensitized paper for enlarging.

Figure 5:
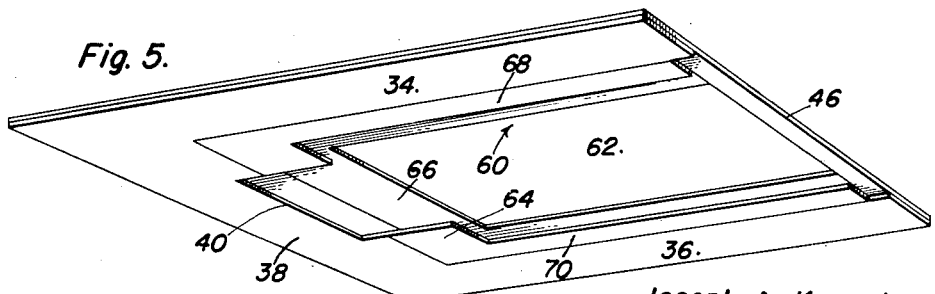
Figure 5 is a perspective view of an adapter element for converting the easel for use in making various size prints.
Figure 4:
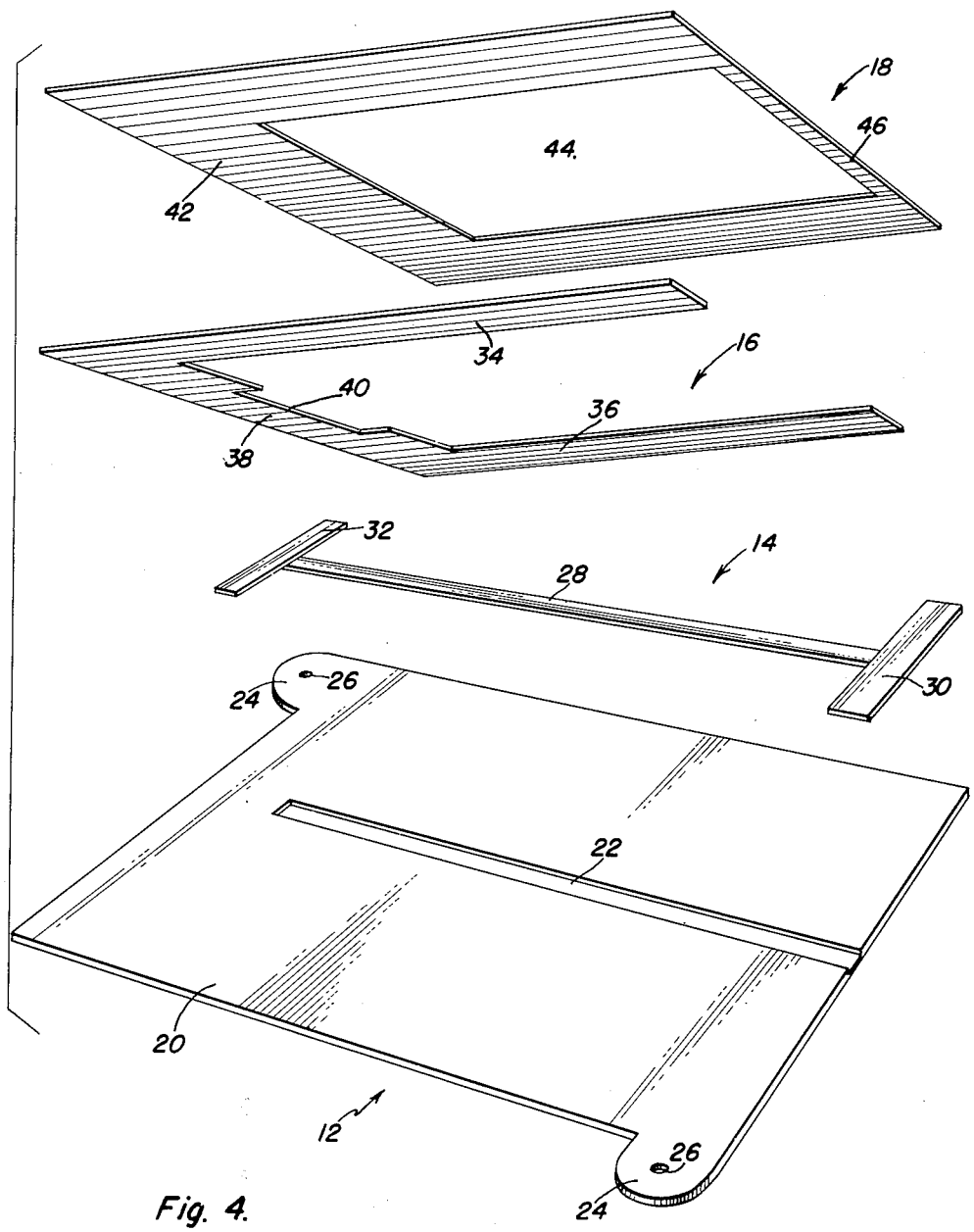
Figure 4 is an exploded perspective view of the invention showing the various elements thereof in greatest detail.

Referring now to Figure 5, there will be seen an adapter element 60 for enabling various sized prints to be made while using the easel.

As explained heretofore, the photographic enlarging mask is made for the largest suitable size of sensitized paper used for photographic purposes and therefore is to be considered as a main enlarging mask. In order to adapt this mask for small sizes of sensitized papers on the market, a separate mask is provided which shall be inserted within the rectangular opening 44 of the plate member 18 which separate mask is provided with an opening 62 to accommodate the small size of sensitized paper. This mask is the adapter element 60.

The adapter mask 60 comprises similar but smaller members 64 and 66 parallel to elements 16 and 18. The member 66 is not provided with a side similar to the side 46. Further, the element 64 has a portion of its end wall adjacent the recess similar to the recess 40 removed. Thus, an opening is provided between the portions 68 and 70 of the member 64. The members 64 and 66 are suitably cemented together. In this manner, a member 14 may readily be allowed to pass within the notch 40 of the member 16 so as to engage the sensitized paper held within the adapter element 60.

The dimensions along the periphery of the adapter element 60 are of the same size as the rectangular opening 44 in plate 42. Further, for use with the next size of paper another adapter mask may be provided to fit within the opening 62 so that an X4 size of sensitized paper may be used. In this manner a full set of adapter elements similar to adapter elements 60 can be provided so that numerous sizes of sensitized paper, as commercially produced, can be used.

The adapter mask is to be constructed of the same materials as used in the construction of the main mask.

If other materials other than white opaque plastic materials are used, these materials are preferably coated or painted with a white substantially non-reflecting finish. The purpose of this finish is to eliminate the necessity of using a sheet of white paper in the enlarging mask when the image is being focussed thereupon for the purpose of obtaining a sharp focus and correct position prior to exposure of the sensitized paper.

It is further to be noted that the other side of the base 12 should be coated or covered with a suitable non-skid material so as to prevent the mask from sliding or slipping out of position during the process of being positioned under the enlarger.

Since from the foregoing, the construction and advantages of this photographic and enlarging mask are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and improvements of this photographic enlarging mask may be resorted to which fall within the scope of the appended claim.

Having described the invention, what is claimed as new is:

An enlarging easel for photographic printing comprising a base member having a longitudinal groove therein, a slide slidably mounted in said groove and having the upper face thereof disposed substantially flush with the upper base of said base member, an intermediate member secured to said base member, said intermediate member comprising a pair of substantially parallel legs and a central connecting portion, a notch in said central connecting portion, and a frame member having an aperture therethrough secured to said intermediate member, a cross bar secured to the upper face of said slide adjacent one end thereof, said cross bar slidably engaging the upper face of said base member and being selectively receivable in said notch for aiding in the withdrawal of a sheet of printing paper when said paper is placed between said frame member and said base member within the compass of said intermediate member, a cross member secured to the end of said slide remote from said cross bar, said cross member projecting above the outer face of said slide for engagment with a paper disposed thereon to aid in the insertion of the paper into said frame.

JOSEPH A. KONOPKA.

REFERENCES CITED

The following references are of record in the file of this patent:

UNITED STATES PATENTS

| Number | Name | Date |
| --- | --- | --- |
| 2,187,381 | Lane | Jan. 16, 1940 |
| 2,427,860 | Jensen | Sept. 23, 1947 |